US010171891B1

(12) United States Patent
Stamatakis

(10) Patent No.: US 10,171,891 B1
(45) Date of Patent: Jan. 1, 2019

(54) SENSOR DEPLOYMENT MECHANISM AT A MONITORED LOCATION

(71) Applicant: Senseware, Inc., McLean, VA (US)

(72) Inventor: Julien G. Stamatakis, Centreville, VA (US)

(73) Assignee: Senseware, Inc., Vienna, VA (US)

( * ) Notice: Subject to any disclaimer, the term of this patent is extended or adjusted under 35 U.S.C. 154(b) by 0 days.

(21) Appl. No.: 15/344,667

(22) Filed: Nov. 7, 2016

Related U.S. Application Data

(63) Continuation of application No. 14/710,170, filed on May 12, 2015, now Pat. No. 9,551,594.

(60) Provisional application No. 61/992,307, filed on May 13, 2014, provisional application No. 62/136,959, filed on Mar. 23, 2015.

(51) Int. Cl.
| | |
|---|---|
| *G08B 29/00* | (2006.01) |
| *H04Q 9/00* | (2006.01) |
| *H04B 1/38* | (2015.01) |
| *H04W 84/18* | (2009.01) |

(52) U.S. Cl.
CPC ............ *H04Q 9/00* (2013.01); *H04B 1/38* (2013.01); *H04Q 2209/40* (2013.01); *H04Q 2209/60* (2013.01); *H04W 84/18* (2013.01)

(58) Field of Classification Search
CPC ................................................ H04L 29/08558
USPC ....................................................... 340/870.2
See application file for complete search history.

(56) References Cited

U.S. PATENT DOCUMENTS

| | | | |
|---|---|---|---|
| 6,584,113 B1 * | 6/2003 | Manduley | H04L 41/00 370/433 |
| 7,142,107 B2 | 11/2006 | Kates | |
| 7,191,097 B1 | 3/2007 | Lee | |
| 7,379,981 B2 | 5/2008 | Elliott et al. | |
| 8,051,489 B1 | 11/2011 | Montenegro | |
| 8,103,389 B2 | 1/2012 | Golden et al. | |
| 8,339,069 B2 | 12/2012 | Chemel | |
| 8,527,096 B2 * | 9/2013 | Pavlak | F24F 11/001 236/1 B |
| 8,527,626 B1 | 9/2013 | Wang | |
| 8,548,630 B2 * | 10/2013 | Grohman | B60H 1/00642 700/276 |
| 8,855,825 B2 * | 10/2014 | Grohman | F24F 11/0009 700/276 |
| 8,892,797 B2 * | 11/2014 | Grohman | H04L 12/407 710/104 |
| 9,714,843 B1 | 7/2017 | Stamatakis et al. | |
| 9,715,239 B2 * | 7/2017 | Fadell | G05D 23/19 |
| 2002/0173704 A1 * | 11/2002 | Schulze | A61M 5/172 600/300 |
| 2005/0054289 A1 * | 3/2005 | Salazar | H04W 92/02 455/39 |

(Continued)

FOREIGN PATENT DOCUMENTS

CN 103687076 3/2014

OTHER PUBLICATIONS

First Action Interview Pilot Program Pre-Interview Communication, U.S. Appl. No. 14/862,280, dated Mar. 8, 2017.

(Continued)

*Primary Examiner* — Santiago Garcia

(57) ABSTRACT

A universal sensor interface enables selective coupling of one or more sensor module units to a wireless node. Each sensor module unit can contain a suite of sensors selected for a particular sensor application at a monitored location. Reconfiguration of the wireless sensor network can occur seamlessly through the plug-and-play connectivity between the sensor module units and the wireless node.

20 Claims, 8 Drawing Sheets

(56) References Cited

U.S. PATENT DOCUMENTS

| | | |
|---|---|---|
| 2006/0059224 A1 | 3/2006 | Yao |
| 2006/0077607 A1 | 4/2006 | Henricks |
| 2007/0211681 A1* | 9/2007 | Sun .................. H04L 45/04 370/338 |
| 2007/0225954 A1 | 9/2007 | Kodesky |
| 2008/0195584 A1 | 8/2008 | Nath |
| 2008/0195757 A1 | 8/2008 | Kim |
| 2008/0240105 A1 | 10/2008 | Abdallah |
| 2009/0033513 A1* | 2/2009 | Salsbury .............. H04W 84/18 340/4.2 |
| 2010/0011340 A1 | 1/2010 | Pandey |
| 2010/0083356 A1 | 4/2010 | Steckley |
| 2010/0141153 A1* | 6/2010 | Recker .............. H05B 33/0803 315/149 |
| 2010/0231386 A1* | 9/2010 | Barnes .................. H01L 31/04 340/541 |
| 2010/0274366 A1 | 10/2010 | Fata |
| 2010/0327766 A1* | 12/2010 | Recker .................. H02J 9/02 315/291 |
| 2011/0034120 A1* | 2/2011 | Jaiyeola .............. F24F 11/006 454/335 |
| 2011/0040809 A1 | 2/2011 | Spanier |
| 2011/0131320 A1* | 6/2011 | Hong .................. H04W 92/02 709/224 |
| 2011/0157366 A1 | 6/2011 | Padmanabh |
| 2011/0197064 A1 | 8/2011 | Garcia Morchon |
| 2011/0248857 A1 | 10/2011 | Rutherford |
| 2011/0255454 A1 | 10/2011 | Hauser |
| 2011/0276738 A1* | 11/2011 | Kim .................. G06F 13/102 710/300 |
| 2012/0098445 A1 | 4/2012 | Park |
| 2012/0098446 A1 | 4/2012 | Kim |
| 2012/0203508 A1 | 8/2012 | Hamzaoui |
| 2012/0269199 A1 | 10/2012 | Chan |
| 2012/0299509 A1 | 11/2012 | Lee |
| 2012/0310599 A1 | 12/2012 | Tanaka |
| 2012/0311413 A1 | 12/2012 | Pelletier |
| 2013/0086195 A1 | 4/2013 | Hiniker |
| 2013/0178195 A1 | 7/2013 | Luna |
| 2014/0085102 A1 | 3/2014 | McCormick |
| 2014/0126581 A1 | 5/2014 | Wang |
| 2014/0207290 A1 | 7/2014 | Crawford |
| 2014/0293993 A1 | 10/2014 | Ryhorchuk |
| 2014/0334653 A1* | 11/2014 | Luna .................. G05B 15/02 381/332 |
| 2014/0337256 A1 | 11/2014 | Varadi |
| 2014/0359133 A1 | 12/2014 | Tian |
| 2015/0021988 A1* | 1/2015 | Barnetson .......... H05B 33/0803 307/23 |
| 2015/0029022 A1 | 1/2015 | Stebbins |
| 2015/0043411 A1* | 2/2015 | Kim .................. H04W 52/0206 370/311 |
| 2015/0097961 A1 | 4/2015 | Ure |
| 2015/0106447 A1 | 4/2015 | Hague |
| 2015/0156286 A1 | 6/2015 | Blair |
| 2015/0316945 A1 | 11/2015 | Soya |
| 2016/0006264 A1 | 1/2016 | Alperin |
| 2016/0019763 A1* | 1/2016 | Raji .................. G06F 1/263 340/506 |
| 2016/0112518 A1 | 4/2016 | Haleem et al. |
| 2016/0121487 A1 | 5/2016 | Mohan |
| 2016/0193895 A1* | 7/2016 | Aich .................. B60H 1/00657 165/202 |
| 2016/0195856 A1* | 7/2016 | Spero .................. G06N 5/046 700/90 |
| 2016/0241445 A1 | 8/2016 | Kim |
| 2017/0048376 A1* | 2/2017 | Logan .............. H04M 1/72533 |

OTHER PUBLICATIONS

Office Action, U.S. Appl. No. 15/389,626, dated Jul. 14, 2017.
First Action Interview Pilot Program Pre-Interview Communication, U.S. Appl. No. 14/710,209, dated Oct. 25, 2016.
Cloud Logger, 38 Zeros, 2015.
Smart Processing Starts at the Edge of the Network, B+B Smartworx, 2014.
Wireless Sensors and Output Devices, ConnectSense, 2015.
It's Time You Experienced Eclypse, Distech Controls, 2014.
Compact Sensor, Enlighted, 2015.
Energy Manager, Enlighted, 2015.
Gateway, Enlighted, 2015.
Enlighted Smart Sensor, 2015.
Manning, Lauren, "Wireless Infrastructure Provider Filament Closes $5m Series A, Shows Promise for Agtech Application," Aug. 21, 2015.
Intellastar, 2015.
Your Internet of Things, Monnit, 2014.
Monnit Industrial Wireless AC Current Meter, 2015.
$3^{rd}$ Generation Nest Learning Thermostat, 2015.
AcquiSuite+ Dtaa Acquisition Server, Obvius, LLC, Installation and Operation Manual, Model A8814, Jan. 11, 2014.
Application Note: ModHopper Makes Submetering Easy, Obvius, LLC, Mar. 29, 2012.
ModHopper—Wireless Modbus/Pulse Transceiver, Obvius, LLC, Installation and Operation, Model R9120 (Rev C), Dec. 11, 2012.
Atmel Corporation, 8-bit AVR Microcontroller with Low Power 2.4GHz Transceiver for ZigBee and IEEE 802.15.4, 2014.
Application Note, Atmel AT06482: Real Color ZLL LED Light Bulb with ATmega256RFR2—Software User's Guide, 2013.
Application Note, AT06412: Real Color ZLL LED Light Bulb with ATmega256RFR2—Hardware User Guide, 2014.
Exploring New Lighting Opportunities with ZigBee Light Link Webinar, May 16, 2012.
Point Six Wireless Wi-Fi Sensor Product Guide, 2015.
Eagle, Rainforest Automation, 2015.
Product Comparison Guide, SmartStruxture Lite solution and wireless devices for SmartStruxture solution, Schneider Electric, Mar. 12, 2015.
SmartStruxure Lite Solution, SEC Series, Smart Terminal Controller (SEC-TE), Schneider Electric, Aug. 1, 2013.
SmartStruxure Lite Solution, Schneider Electric, May 1, 2015.
SmartStruxure Lite Solution, Our open system approach to standards and protocols, Schneider Electric, Jul. 2, 2014.
Senseware, Mar. 25, 2014.
Product Data Sheet, SWS-DPC Wireless Pulse Counters, SpinWave Systems, Inc., 2007.
Product Data Sheet, SWC-TSTAT-3 Wireless Thermostat Controller, SpinWave Systems, Inc., 2012.
A3 Wireless Sensor Network, SpinWave Systems, Inc., 2007.
Veris Industries, 2015.
U.S. Appl. No. 62/025,640, entitled "Separation of Current Sensor and Voltage Sensor for True Power Measurement," filed Jul. 17, 2014.
Khamphanchai et al., Conceptual Architecture of Building Energy Management Open Source Software (BEMOSS), 5th IEEE PES Intelligent Smart Grid Technologies (ISGT) European Conference, Oct. 12-15, 2014.
Dolphin Core Description, EnOcean, Jul. 21, 2014.
Remote Management 2.0, EnOcean, Mar. 6, 2013.
EnOcean—The World of Energy Harvesting Wireless Technology, Feb. 2015.
Wireless Sensor Solutions for Home & Building Automation—The Successful Standard Uses Energy Harvesting, EnOcean, Aug. 10, 2007.
Metasys® System Product Bulletin, Code No. LIT-1201526, Release 7.0, Dec. 5, 2014.
Metasys® System Extended Architecture Wireless Network, Application Note, Oct. 24, 2006.
Metasys® System Field Equipment Controllers and Related Products, Product Bulletin, Code No. LIT-12011042, Software Release 5.0, Jun. 21, 2010.
ZFR1800 Series Wireless Field Bus System, Technical Bulletin, Code No. LIT-12011295, Software Release 10.1, Dec. 5, 2014.
Wireless Metasys® System Product Bulletin, Code No. LIT-12011244, Software Release 5.0, Jan. 4, 2010.

(56) References Cited

OTHER PUBLICATIONS

Environmental Index™—Balancing Efficiency with Comfort, Automated Logic Corporation, 2013.
Equipment Portal, Automated Logic Corporation, 2013.
EnergyReports™Web Application—A Tool for Sustainable Building Operations, Automated Logic Corporation, 2013.
WebCTRL®—Powerful and Intuitive Front End for Building Control, Mar. 26, 2015.
ISelect Adds New Portfolio Company: Bractlet, 2015.
Know—Bractlet.
Analyze—Bractlet.
Ensure—Bractlet.
Announcing Samsara: Internet connected sensors, May 18, 2015.
Samsara—Internet Connected Sensors.
Samsara—Features.
Samsara—Models.
Samsara—API.
Press Release, Helium Makes Sense of the Internet of Things, Oct. 27, 2015.
Press Release, Helium Introduces Another Smart Sensor for Environmental Monitoring, Apr. 25, 2016.
Press Release, Helium Announces Helium Pulse Monitoring and Alerting Application, Apr. 25, 2016.
EE Times, IoT Startup Revises 802.15.4 Nets, Oct. 27, 2015.
Helium Pulse™ for Monitoring and Alerting, 2016.
Helium Green™ Environmental Smart Sensor, 2016.
Helium Blue™Temperature & Door Smart Sensor, 2016.
Office Action, U.S. Appl. No. 14/710,170, dated Jul. 19, 2016.
Office Action, U.S. Appl. No. 15/145,871, dated Sep. 30, 2016.
First Action Interview Pilot Program Pre-Interview Communication, U.S. Appl. No. 14/926,118, dated Jul. 11, 2017.
First Action Interview Pilot Program Pre-Interview Communication, U.S. Appl. No. 14/926,089, dated Jun. 19, 2017.
Notice of Allowance, U.S. Appl. No. 14/871,014, dated Aug. 1, 2017.
First Action Interview Pilot Program Pre-Interview Communication, U.S. Appl. No. 14/871,014, dated May 31, 2017.
Office Action, U.S. Appl. No. 15/264,697, dated Jul. 21, 2017.
Office Action, U.S. Appl. No. 14/926,089, dated Nov. 13, 2017.
Office Action, U.S. Appl. No. 14/926,118, dated Oct. 4, 2017.
Notice of Allowance, U.S. Appl. No. 14/926,089, dated Jul. 26, 2018.
First Action Interview Pilot Program Pre-Interview Communication, U.S. Appl. No. 14/996,442, mailed Dec. 6, 2017.
Final Office Action, U.S. Appl. No. 15/264,697, dated Mar. 5, 2018.
Office Action, U.S. Appl. No. 14/926,118, dated Sep. 5, 2018.
Office Action, U.S. Appl. No. 15/790,123, dated Jul. 25, 2018.

* cited by examiner

SENSOR DEPLOYMENT MECHANISM AT A MONITORED LOCATION

This application is a continuation of non-provisional application Ser. No. 14/710,170, filed May 12, 2015, which claims the benefit of and priority to provisional application No. 61/992,307, filed May 13, 2014, and to provisional application No. 62/136,959, filed Mar. 23, 2015. Each of the above-identified applications is incorporated herein by reference in its entirety.

BACKGROUND

Field

The present disclosure relates generally to sensor applications, including a sensor deployment mechanism at a monitored location.

INTRODUCTION

Sensors can be used to monitor physical or environmental conditions. Wireless sensor networks can be used to collect data from distributed sensors and to route the collected sensor data to a central location.

BRIEF DESCRIPTION OF THE DRAWINGS

In order to describe the manner in which the above-recited and other advantages and features can be obtained, a more particular description will be rendered by reference to specific embodiments thereof which are illustrated in the appended drawings. Understanding that these drawings depict only typical embodiments and are not therefore to be considered limiting of its scope, the disclosure describes and explains with additional specificity and detail through the use of the accompanying drawings in which.

DETAILED DESCRIPTION

Various embodiments are discussed in detail below. While specific implementations are discussed, it should be understood that this is done for illustration purposes only. A person skilled in the relevant art will recognize that other components and configurations may be used without parting from the spirit and scope of the present disclosure.

Sensors provide a mechanism for discovering and analyzing the state of physical or environmental conditions. Wireless sensor networks provide an efficient mechanism for connecting with and retrieving sensor data from a distributed set of sensors. The growing emphasis on the Internet of Things (IoT) has further reinforced the importance of wireless networks in connecting a range of devices. Notwithstanding today's emphasis on connecting a variety of devices using wireless communication, it is recognized in the present disclosure that the penetration of wireless sensor networks into the marketplace is limited due to the high level of installation and maintenance costs.

By their very nature, sensors are designed to measure a particular physical or environmental condition. Sensors therefore represent a class of application-specific devices. Every sensor network installation can be designed with unique cost constraints, measurement objectives, site restrictions, or other application-specific requirements that can influence sensor network design. These application-specific qualities lead to significant challenges in identifying a scalable solution that can be applied across various industries and markets. For example, it is recognized that a scalable solution should be flexible in accommodating new types of sensor applications with little redesign or redeployment of a wireless sensor network. Such a scalable solution would significantly reduce installation and maintenance costs as new sensors and application features are rolled out across an already deployed sensor network infrastructure. It is recognized that sensor network solutions should enable an evolution of the deployed wireless sensor network without wasting previously-deployed wireless sensor network elements or requiring significant time or expense in modifying the previously-deployed wireless sensor network.

Figure 1:
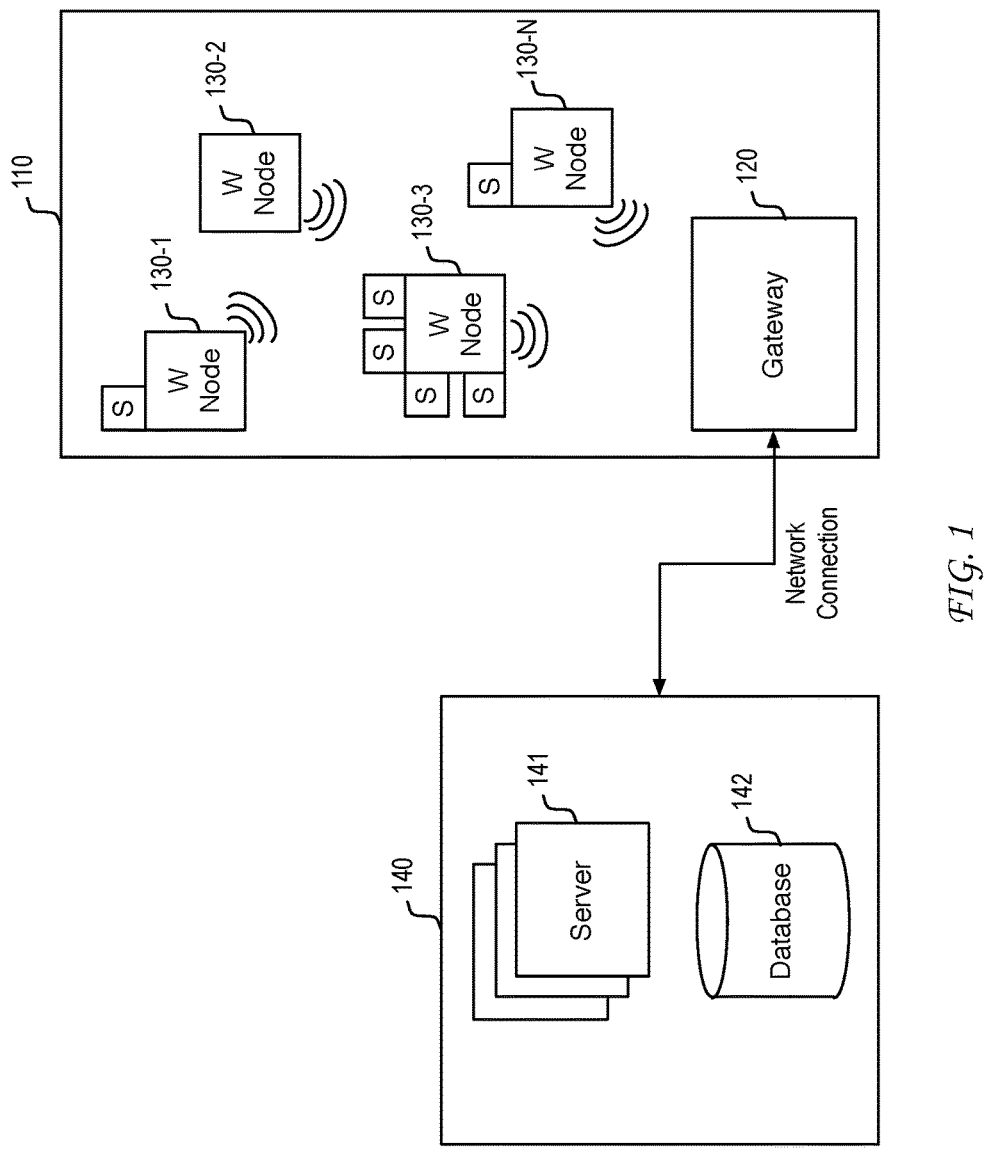
FIG. 1 illustrates an example embodiment of a wireless sensor network that can collect and distribute sensor information.

FIG. 1 illustrates an example embodiment of a wireless sensor network that can collect and distribute sensor information. The wireless sensor network can be configured to collect and distribute sensor information that is based on measurements by sensors deployed at monitored location 110. Monitored location 110 can represent any area where a collection of sensors is deployed. Monitored location 110 may or may not represent a physical area having clearly defined boundaries. As would be appreciated, the extent of the monitoring application itself provides a sense of boundary to monitored location 110. In one example, monitored location 110 can represent a building such as a home, hotel, school, community building, stadium, convention center, warehouse, office building, multi-dwelling unit, or other defined building structure. In another example, monitored location 110 can represent an area of control such as a monitored area that can be fixed or movable.

Disposed within monitored location 110 is a plurality of sensors. Communication between the plurality of sensors and gateway device 120 is facilitated by a set of wireless nodes 130-n. In general, wireless nodes 130-n can be configured to form a wireless mesh network. In one embodiment, the communication protocol between wireless nodes 130-n is based on the IEEE 802.15.4 protocol. A wireless mesh network can be formed between wireless nodes 130-n and can be used to facilitate communication between any wireless node 130-n and gateway device 120.

A wireless node 130-n can be configured to support one or more sensor module units (S), each of which can be individually coupled to a wireless node 130-n via a plug-and-play universal sensor interface. The plug-and-play universal sensor interface facilitates the separation of the wireless node communication infrastructure from the set of one or more sensor module units that are deployed at the location at which the supporting wireless node 130-*n* is installed. This separation creates significant flexibility in choice of sensors that may or may not be deployed proximate to the time of installation of the supporting wireless node 130-*n*. As such, the plug-and-play universal sensor interface enables a sensor network solution to respond to changes in the sensor application requirements at monitored location 110 without incurring significant re-deployment costs.

This flexibility would not be available if sensors were integrated with a wireless node. When a wireless node is deployed with integrated sensors, the monitoring capability of the wireless node is limited to the sensors that were pre-installed in the wireless node. This pre-installation would fix the capability of the wireless node at the time of deployment and would limit the wireless node to a static sensor application objective. Thus, if a defective sensor needs to be replaced, or if another type of sensor needs to be added to meet a dynamic sensor application objective, then the wireless node would need to be replaced or otherwise modified. This would impact at least part of the wireless sensor network infrastructure, which can result in sensor network downtime at the monitored location. A further impact would be produced as the maintenance expense of such a replacement or modification would be prohibitive.

In the present disclosure, the plug-and-play universal sensor interface enables the sensor module units to be deployed separately from wireless nodes 130-*n*. The plug-and-play universal sensor interface allows any type of sensor module unit to be connected to any wireless node 130-*n* at any time and without any reconfiguration of the supporting wireless network infrastructure. This feature allows great flexibility in the deployment and modification of wireless sensor networks at a lower price point. Additionally, the plug-and-play universal sensor interface enables the monitoring capabilities of the wireless sensor network to scale seamlessly with the dynamic nature of changing sensor application objectives.

In one example, a wireless node 130-*n* can be configured to support four sensor module units. As would be appreciated, the particular number of sensor module units that can be supported by a wireless node 130-*n* can vary. Sensor module units can be added onto wireless nodes 130-*n* sequentially at different deployment times. Thus, for example, a first sensor module unit can be added at a time of installation of the wireless node 130-*n*, with one or more additional sensor module units added to the same wireless node 130-*n* in the future as needed to address changing sensor application objectives.

In one embodiment, each of the sensor module units can support a plurality of individual sensors. In one example, a sensor module unit can support a set of eight sensors. In this example, the set of eight sensors can include sensors of one or more types. For example, sensors in a sensor module unit can include one or more of the following: a temperature sensor, a humidity sensor, an air quality sensor (e.g., $CO_2$ sensor), a light sensor, a sound sensor, a contact sensor, a pulse sensor, a water sensor, or any other type of sensor configured to measure a characteristic of a part of monitored location 110. A sensor module unit can include multiple sensors of a single type. For example, a particular configuration of a sensor module unit can include four pulse sensors, one temperature sensor, one humidity sensor, one air quality sensor, and one light sensor. In another example, a particular configuration of a sensor module unit can include eight sensors of a single type. As would be appreciated, the set of sensors included within a particular sensor module unit can be chosen to meet a given sensor application objective.

In the present disclosure, it is recognized that sensor module units can be targeted or otherwise designed for a particular class of sensor applications. For example, one sensor module unit can be designed for sensor applications targeted to school buildings, while another sensor module unit can be designed for sensor applications targeted to office buildings. The sensor module unit targeted for school building use can include a set of sensors that are popular with school building sensor applications. For instance, the set of sensors can include pulse sensors for measuring utility consumption (e.g., gas, water, electricity), a temperature sensor, an air quality sensor, a humidity sensor and a light sensor. The sensor module unit targeted for school building use can then be selected for installation with wireless nodes deployed in school buildings. In this manner, a relatively generic sensor module unit can be deployed across many sensor application deployments in various schools without requiring full customization for a specific application at a particular school. Production costs of the sensor module units are thereby minimized without any loss of flexibility in deploying customized sensor module units.

The impact on economies of scale can be readily appreciated. Wireless node modules can be produced on a larger manufacturing scale because the generic wireless nodes can be applied in many types of monitored locations in a manner that is separate from the particular sensor objectives at the particular monitored location. Correspondingly, a limited number of types of sensor module units can be manufactured. For example, a first sensor module unit type can be produced for office building applications and can include a suite of sensors typically used in office buildings. Similarly, a second sensor module unit type can be produced for school building applications and can include a suite of sensors typically used in school buildings.

In the deployment at a particular monitored location, the generic wireless nodes can be installed at the particular monitoring points in the monitored location with the particular type of sensor module unit attached to the generic wireless node to meet the particular needs at that monitoring point. Customization of this nature is far superior to the limited options presented by integrated devices. Customization need not result in wireless sensor network downtime and can be effected through the selective coupling of particular sensor module units to wireless nodes.

A further benefit of this form of customization is that it obviates the need to re-qualify and test wireless nodes to meet a new sensor application. Qualification need only be performed on new sensor module units since the existing wireless network infrastructure provided by the generic wireless nodes had previously been qualified and tested. This reduces the time needed to bring new sensor network features to market in addressing new market opportunities. If, on the other hand, sensors were integrated with the wireless nodes, then the entire device would need to be re-qualified and tested before being brought to market. As described, the plug-and-play universal sensor interface enables sensor network application customization without increasing installation and maintenance costs of the sensor network infrastructure.

Returning to FIG. 1, wireless node 130-1 is illustrated as supporting a single sensor module unit (S). Wireless node 130-2, on the other hand, is illustrated as not supporting any sensor module units. This example illustrates a scenario where wireless node 130-2 has been specifically installed as a wireless relay node in a wireless mesh network to facilitate a connection between wireless node 130-1 and gateway 120. As further illustrated, wireless node 130-3 supports four different sensor module units (S). This example illustrates a scenario where the sensing needs of a particular part of monitored location 110 is greater and would therefore require additional installed sensors at the location of wireless node 130-3. For instance, wireless node 130-3 can be installed in a hub of sensing activity at monitored location 110, while wireless node 130-1 or wireless node 130-N can be installed in a periphery of sensing activity at monitored location 110. The plug-and-play universal sensor interface enables sensor module unit deployment to match sensor application needs in a manner that scales seamlessly with the deployed wireless network infrastructure. Deployment and maintenance costs are thereby contained.

The wireless mesh network created by wireless nodes 130-n facilitates communication between sensor module units and gateway 120 via the wireless network infrastructure established by wireless nodes 130-n. Gateway 120 can be installed at monitored location 110 and can be provided with network connectivity. For example, gateway 120 can be provided with a network connection that facilitates communication of sensor data to host system 140. The network connection can be embodied in various forms depending upon the particular characteristics of monitored location 110.

For example, where monitored location 110 is a building in a developed area, then the network connection can be facilitated by a wired Internet connection via an Internet service provider. In another example, where monitored location 110 represents a remote physical area (or movable area) that may or may not include a building structure, then the network connection can be facilitated by a terrestrial or satellite based wireless network. As would be appreciated, the principles of the present disclosure would not be dependent on the particular form of network connection supported by gateway 120 in communicating with host system 140.

The network connection between gateway 120 and host system 140 enables the collection of sensor data by host system 140. In one embodiment, host system 140 can be located in a location remote from gateway 120. In general, host system 140 can be configured to perform a collection of sensor data from monitored location 110, storage of sensor data in database 142, and a distribution of sensor data to one or more destinations. As illustrated, host system 140 can include one or more servers 141 that can facilitate the collection, storage and distribution processes.

Figure 2:
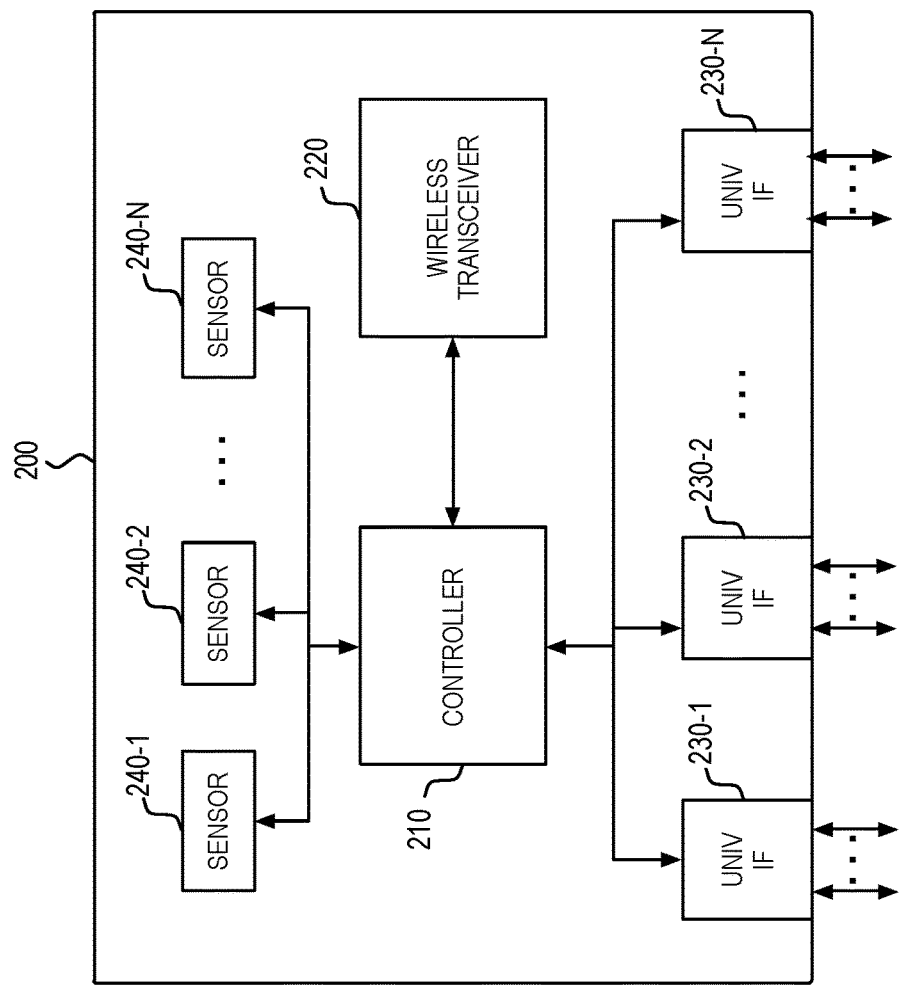
FIG. 2 illustrates an example embodiment of a wireless node.

As described, wireless nodes 130-n provide a wireless network infrastructure upon which sensor module units can be deployed for a customized sensor application. FIG. 2 illustrates an example embodiment of a wireless node. As illustrated, wireless node 200 includes controller 210 and wireless transceiver 220. In one embodiment, wireless node 200 can be powered via a battery source (not shown). In another embodiment, wireless node 200 can be powered via an external power source available at the point of installation at the monitored location.

Wireless transceiver 220 facilitates wireless communication between wireless node 200 and a gateway or another wireless node that operates as a relay between wireless node 200 and the gateway. The sensor data communicated by wireless transceiver 220 is collected by controller 210 via one or more universal sensor interfaces 230-n. Each universal sensor interface 230-n can support connection of wireless node 200 with a separate sensor module unit that can be attached to wireless node 200.

Universal sensor interfaces 230-n can represent a combination of hardware and software. The hardware portion of universal sensor interfaces 230-n can include a wired interface that enables communication of different signals between wireless node 200 and a connected sensor module unit. In one example, the wired interface can be enabled through a connector interface, which is exposed by the housing of the wireless node 200, and that is configured to receive a sensor module unit connector via removable, pluggable insertion.

In one embodiment, the wired interface can be based on a Serial Peripheral Interface (SPI) bus. In one example, the wired interface enables six connections: supply, ground, data in, data out, clock, and device select. The device select connection can be unique to each wired interface and can enable controller 210 in wireless node 200 to select the particular sensor module unit with which wireless node 200 desires to communicate. The software portion of the universal sensor interfaces 230-n can include a protocol that allows wireless node 200 to communicate with a sensor module unit.

In one example protocol, controller 210 can be configured to poll the various universal sensor interfaces 230-n to determine whether any sensor module units are connected. As part of this protocol, controller 210 can first request a sensor ID from a sensor module unit. If the response read is 0, then controller 210 would know that no sensor module unit is connected to that universal sensor interface 230-n. If, on the other hand, the response read is not 0, then controller 210 would ask for the number of data values that have to be retrieved and the number of bits on which the data values are coded. In one example, the higher order 8-bits of a 16-bit communication between controller 210 and a sensor module unit identifies the number of data values, while the lower order 8-bits of the 16-bit communication identifies the number of bits used to code each data value. Based on the number of data values to be retrieved, controller 210 would then collect that number of data values, wherein each value can represent a different sensor channel of the sensor module unit.

In one example, a wireless node can be configured for coupling to four different sensor module units. If each of the sensor module units can include up to eight sensors, then the wireless node can be configured to communicate 32 sensor channels of data to the gateway via wireless transceiver 220.

In the illustration of FIG. 2, wireless node 200 also includes one or more sensors 240-n. In one example, sensors 240-n can be contained within or otherwise supported by the housing of wireless node 200. In various scenarios, the one or more sensors 240-n can facilitate monitoring at that part of the monitored location, including the health and/or status of wireless node 200. In one example configuration, sensors 240-n can include a temperature sensor, a humidity sensor, a voltage sensor, a link quality sensor, or any other sensor that can be used to facilitate the sensing needs of wireless node 200.

As noted, wireless nodes can be designed as a generic communication node upon which customized sensing functionality can be added through the connection of particular sensor module units. In this framework, the wireless nodes can be constructed with base communication functionality that can operate independently of particular sensors. As such, the wireless nodes can provide a relatively stable wireless network infrastructure that can support multiple generations of sensor module units. As would be appreciated, the requirements of the sensor module units would be dependent on the particular sensing application. For example, a first sensor module unit can be designed with a first generation sensor having a first degree of accuracy, reliability, or other sensor characteristic, while a second sensor module unit can be designed with a second generation sensor of the same type having a second degree of accuracy, reliability, or other sensor characteristic. As this example illustrates, different generations of sensor module units can be attached to the same wireless node using the plug-and-play universal sensor interface. The original investment in the wireless node would not be lost should the second sensor module unit replace the originally-installed first sensor module unit. A low-cost evolutionary path of the wireless sensor network would therefore be enabled that could scale seamlessly with a customer's needs, sensor technology, or other factor that implicates a sensor module unit modification.

Figure 3:
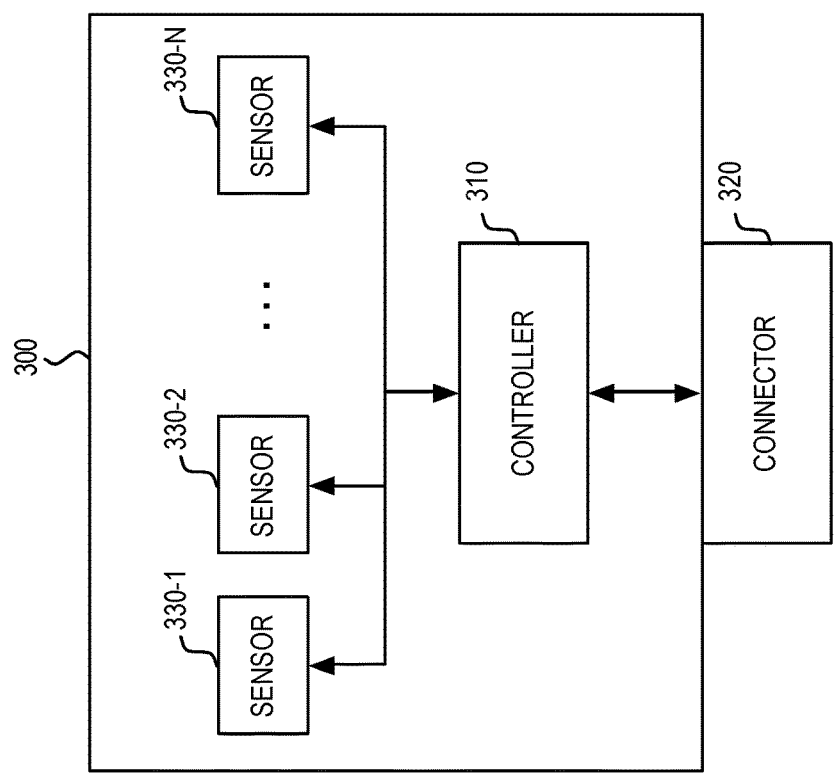
FIG. 3 illustrates an example embodiment of a sensor module unit.

FIG. 3 illustrates an example embodiment of a sensor module unit designed for attachment to a wireless node. As illustrated, sensor module unit 300 includes controller 310 that communicates over a universal sensor interface with the wireless node. In one embodiment, sensor module unit 300 supports a connector 320 configured for pluggable, removable insertion into a connector interface exposed by the wireless node. In another embodiment, the sensor module unit can be coupled to the connector interface exposed by the wireless node via a connector attached to a cable.

Sensor module unit 300 can include a plurality of sensors 330-$n$. In one example, sensor module unit 300 includes up to eight sensors of one or more types. In the present disclosure, it is recognized that a sensor module unit can be pre-populated with a suite of sensors targeted to a particular class of sensor applications. In this framework, a first suite of sensors can be used in a first sensor module unit targeted to a first sensor application (e.g., school buildings), while a second suite of sensors can be used in a second sensor module unit targeted to a second sensor application (e.g., office buildings) different from the first sensor application. Here, the underlying wireless network infrastructure can remain the same while particular sensor module units are chosen for coupling to one or more wireless nodes to facilitate a particular sensor application at a monitored location.

Figure 4:
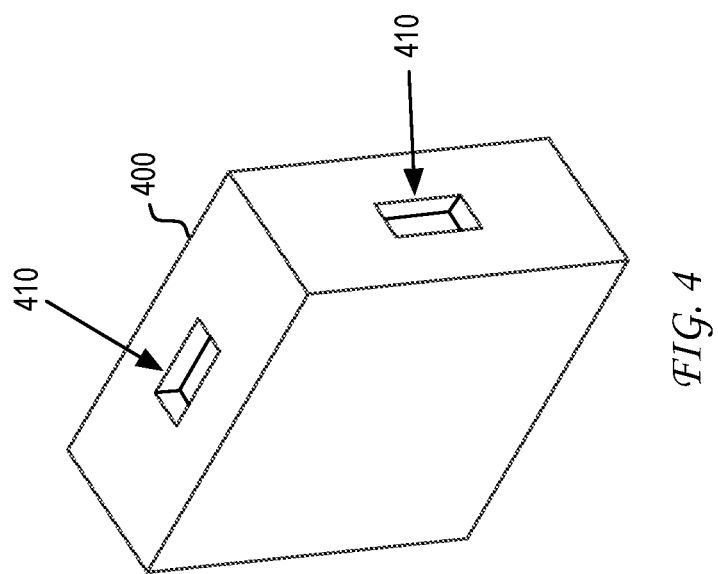
FIG. 4 illustrates an example embodiment of a housing of a wireless node that exposes connector interfaces.

The plug-and-play nature of the connection of sensor module units to supporting wireless nodes facilitates a modular framework of installation of a wireless sensor network. FIG. 4 illustrates an example embodiment of a housing of a wireless node that exposes a plurality of connector interfaces to produce the modular framework. As illustrated, wireless node 400 can have a housing configured to expose a plurality of connector interfaces 410. Each of the plurality of connector interfaces 410 can support the physical attachment of a single sensor module unit. In the example illustration, each side of the housing of wireless node 400 exposes a single connector interface 410. In the present disclosure, it is recognized that the housing of the wireless node can be substantially larger than the housing of the sensor module unit. This can result, for example, because the wireless node can be designed with additional components such as an internal power source (e.g., battery) that can involve additional volume requirements as compared to the sensor module units. It is therefore recognized that one embodiment of a wireless node can have multiple sensor module units physically attached to a single side of the wireless node.

Figure 5:
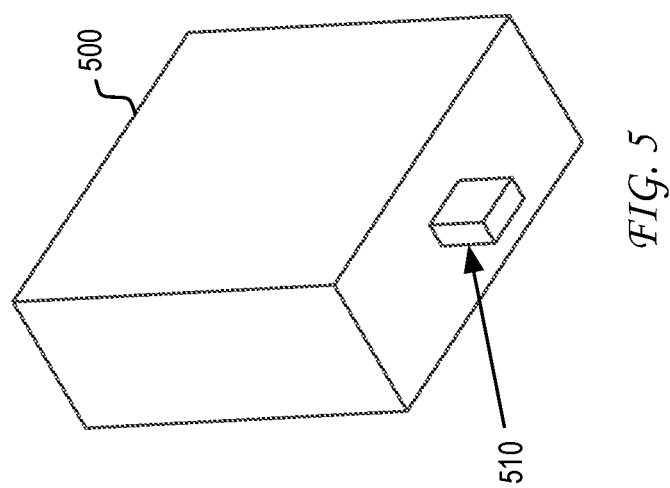
FIG. 5 illustrates an example embodiment of a housing of a sensor module unit.

FIG. 5 illustrates an example embodiment of a housing of a sensor module unit that enables the modular framework. As illustrated, sensor module unit 500 supports a connector 510 that can be configured for pluggable, removable insertion into a corresponding connector interface 410 exposed by the housing of wireless node 400. The connection of sensor module unit 500 to wireless node 400 via the insertion of connector 510 into connector interface 410 produces a true plug-and-play framework of wireless sensor network deployment.

Figure 6:
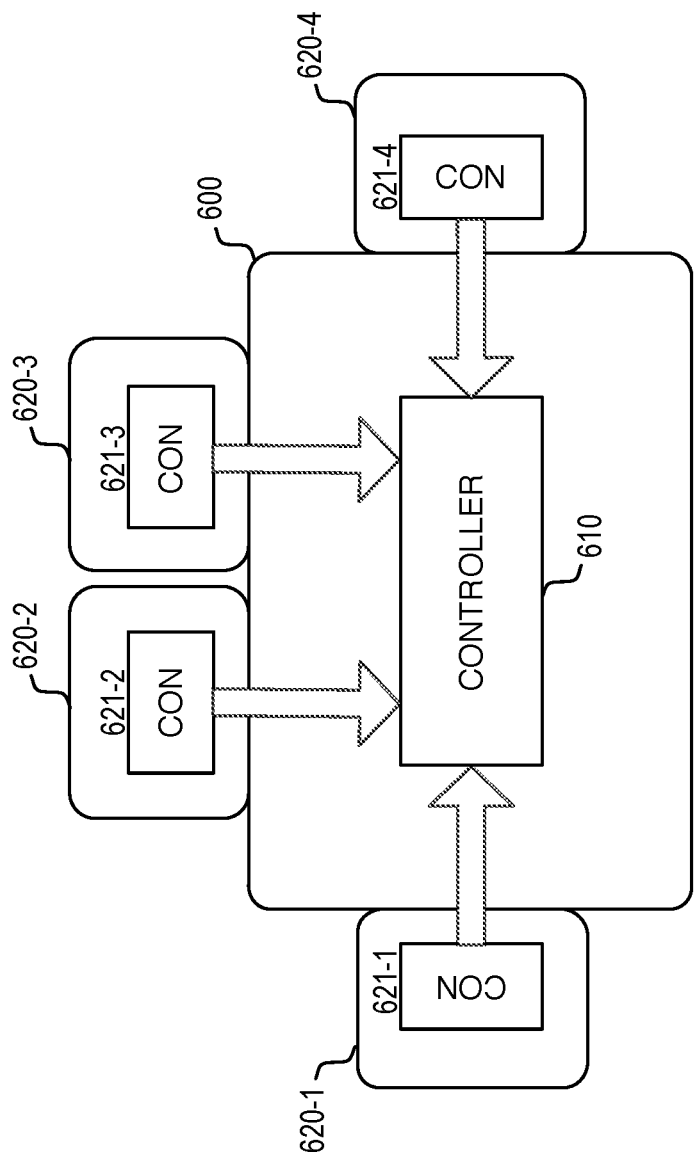
FIG. 6 illustrates an example embodiment of a wireless node that is physically attached to a plurality of sensor module units.

FIG. 6 illustrates an example embodiment of a wireless node that is physically attached to a plurality of sensor module units via universal sensor interfaces. As illustrated, wireless node 600 is attached to sensor module unit 620-1, sensor module unit 620-2, sensor module unit 620-3, and sensor module unit 620-4 via four connector interfaces exposed by the housing of wireless node 600. The attachment of sensor module unit 620-1 to wireless node 600 enables communication of sensor data between controller 621-1 and controller 610. The attachment of sensor module unit 620-2 to wireless node 600 enables communication of sensor data between controller 621-2 and controller 610. The attachment of sensor module unit 620-3 to wireless node 600 enables communication of sensor data between controller 621-3 and controller 610. Finally, the attachment of sensor module unit 620-4 to wireless node 600 enables communication of sensor data between controller 621-4 and controller 610. Each of sensor module units 620-1 to 620-4 can be coupled to wireless node 600 via a separate universal sensor interface having the connectivity characteristics described above.

Controller 610 in wireless node 600 can communicate with each of sensor module units 620-1 to 620-4 to retrieve sensor data generated by one or more sensors on the respective sensor module units 620-1 to 620-4. In one embodiment, the sensor channels of data that are communicated from sensor module unit 620-$n$ to wireless node 600 are configurable. As noted, communication between controller 610 and the sensor module units 620-1 to 620-4 can be based on a protocol that enables identification of the number of data values that are transmitted from each of sensor module units 620-1 to 620-4 to controller 610.

In one embodiment, a sensor module unit can be configured to transmit data from only a subset of the sensors on the sensor module unit. To illustrate this embodiment, consider again the example of a sensor module unit targeted for school building use. In this example, the sensor module unit can include a standard suite of eight sensors, including four pulse sensors for measuring utility consumption (e.g., gas, water, electricity), a temperature sensor, an air quality sensor, a humidity sensor and a light sensor. Individual sensors in this standard suite of sensors can be activated selectively such that only a subset of the sensor channels of data is forwarded from the sensor module unit to the wireless node.

Here, it is recognized that the selective transmission of sensor channels of data can be used to support efficient wireless bandwidth use or reduced power consumption within the wireless sensor network at the monitored location. Moreover, the selective transmission of sensor channels of data can support a billing model where customers pay per sensor channel stream of data that is exposed by the host system to the customer. Additionally, customization of a sensor module unit after installation enables remote customization, which thereby lowers the cost of installation and maintenance incurred by personnel responsible for configuring the wireless sensor network at the monitored location. As would be appreciated, this aspect of configuration can be designed to reduce the amount of pre-installation customization required in setting up sensor module unit 620-$n$ to operate with wireless node 600 at the monitored location.

Figure 7:
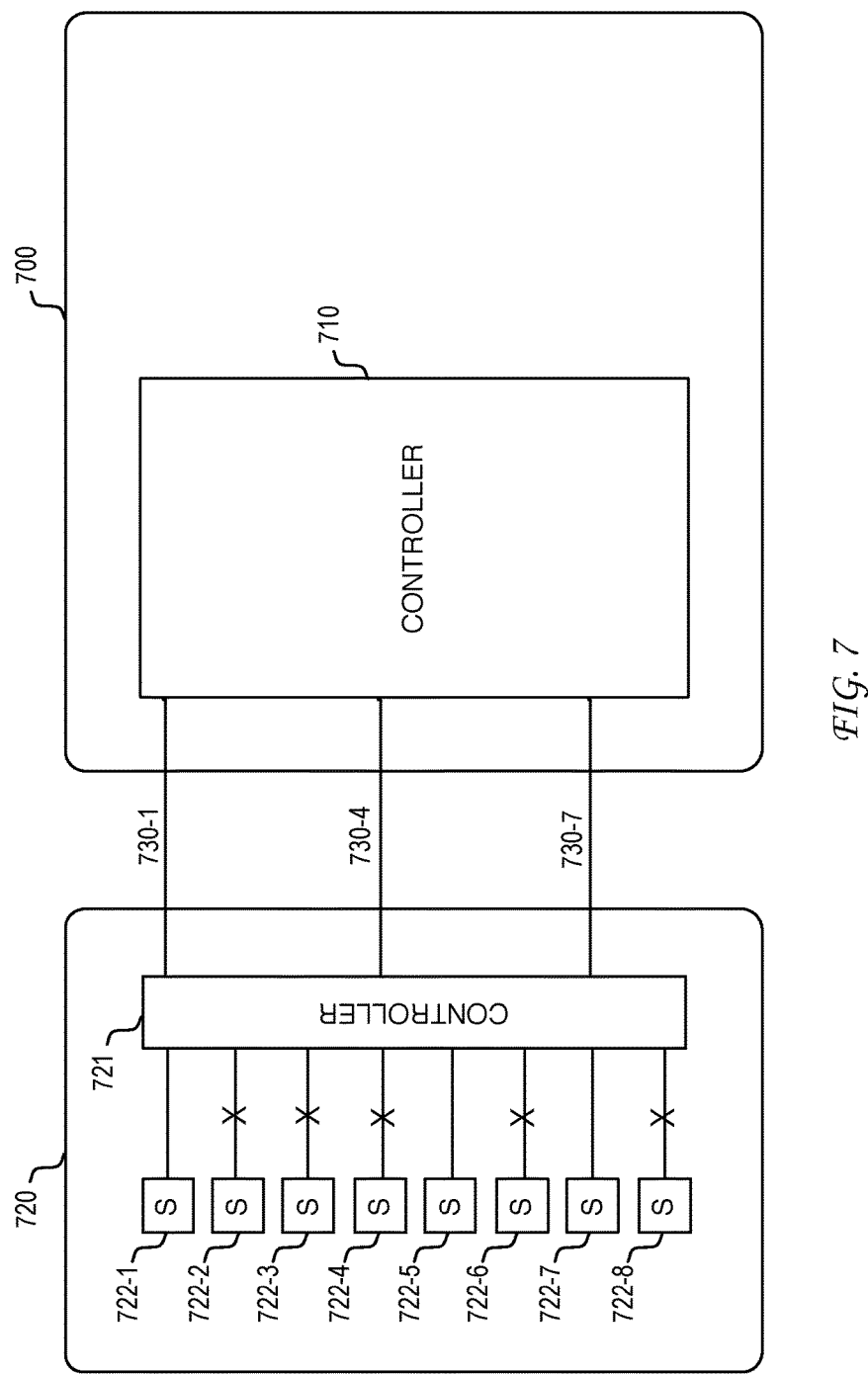
FIG. 7 illustrates an example embodiment of a configuration of a set of sensor channels between a wireless node and a sensor module unit.

FIG. 7 illustrates an example embodiment of the configuration of a set of sensor channels between a sensor module unit and a wireless node. As illustrated, wireless node 700 includes controller 710, while sensor module unit 720 includes controller 721. Controller 710 in wireless node 700 and controller 721 in sensor module unit 720 are configured to communicate using a universal sensor interface such as that described above.

In this example, assume that sensor module unit 720 includes eight sensors 722-1 to 722-8 (e.g., four pulse sensors for measuring utility consumption, one temperature sensor, one air quality sensor, one humidity sensor and one light sensor), which can represent a standard suite of sensors targeted for school building use. After sensor module unit 720 has been attached to wireless node 700 via a universal sensor interface, channels of data associated with a first subset of the suite of eight sensors 722-1 to 722-8 can be activated, while channels of data associated with a second subset of the suite of eight sensors 722-1 to 722-8 can be deactivated.

For example, assume that sensors 722-1 to 722-4 are pulse sensors, sensor 722-5 is a temperature sensor, sensor 722-6 is an air quality sensor, sensor 722-7 is a humidity sensor, and sensor 722-8 is a light sensor. As illustrated, sensor module unit 720 can be configured such that channels of data associated with a first subset of sensors, including pulse sensor 722-1, temperature sensor 722-5 and humidity sensor 722-7 are activated. Correspondingly, sensor module unit 720 can be configured such that channels of data associated with a second subset of sensors, including pulse sensors 722-2 to 722-4, air quality sensor 722-6 and light sensor 722-8 are deactivated. This example can represent a scenario where the part of the monitored location at which wireless node 700 is installed has only one measurable utility consumption (e.g., water) that requires monitoring along with a need for temperature and humidity sensor readings.

Since channels of data associated with pulse sensors 722-2 to 722-4, air quality sensor 722-6 and light sensor 722-8 have been deactivated, controller 721 would report to controller 710 that controller 721 has only three data values for retrieval. These three data values are represented by the sensor channels 730-1, 730-4 and 730-7 that are passed between controller 721 in sensor module unit 720 to controller 710 in wireless node 700 over the universal sensor interface. As this example illustrates, the configuration of the activated/deactivated sensor channels of data enables customization to meet the particular needs of a particular part of a monitored location.

As noted, the wireless node can be coupled to a plurality of sensor module units. Different subsets of sensor channels of data in each sensor module unit can be activated/deactivated as needed. In combination, a customized set of sensor channels of data across the plurality of sensor module units can be activated/deactivated as needed.

Here, it should be noted that the configuration of the first subset of activated sensor channels of data and the second subset of deactivated sensor channels of data can be accomplished in different ways based on various considerations. Where wireless bandwidth in the wireless sensor network is the primary concern, then the controller in the wireless node can be configured to filter the sensor channels of data that are transmitted to the gateway. In this scenario, the full set of sensors in the sensor module unit can be activated, but only a subset of the sensor channels of data provided by the sensor module unit to the wireless node would be transmitted to the gateway.

Where power consumption is the primary concern, then the sensor module unit can deactivate a subset of the available sensors in a manner illustrated in FIG. 7 such that power is not unnecessarily expended at both the sensor module unit and the wireless node in capturing unneeded data at the sensor module unit, transmitting unneeded data from the sensor module unit to the wireless node, and transmitting unneeded data from the wireless node to the gateway.

Where exposure of sensor channels of data to a customer is the primary concern, then the filtering of sensor channels of data can occur at the host system. In this scenario, all of the sensor channels of data from all available sensors can be transmitted to the host system via the wireless sensor network and gateway. Only a fraction of the transmitted sensor channels of data, however, would actually be exposed to the customer as part of the billing model.

As has been illustrated, the relative activation/deactivation of sensor channels of data can occur at different levels of the wireless sensor network at the monitored location. The particular point at which "filtering" of sensor channels of data would occur would be dependent on the particular goals of the "filtering." As would be appreciated, a combination of "filtering" at the sensor module unit, wireless node, gateway, host system, or any other point in the collection and distribution of sensor channels of data to an end user can be used.

The collection of sensor data in a sensor module unit can vary. As described, different suites of sensors can be defined such that each individual suite of sensors can be targeted for a particular sensor application. Customization of sensors at a particular part of a monitored location can then represent an installation of a particular sensor module unit having a particular suite of sensors followed by a selective activation/deactivation of individual sensors in the installed sensor module unit to suit the particular sensor application needs at that part of the monitored location.

Figure 8:
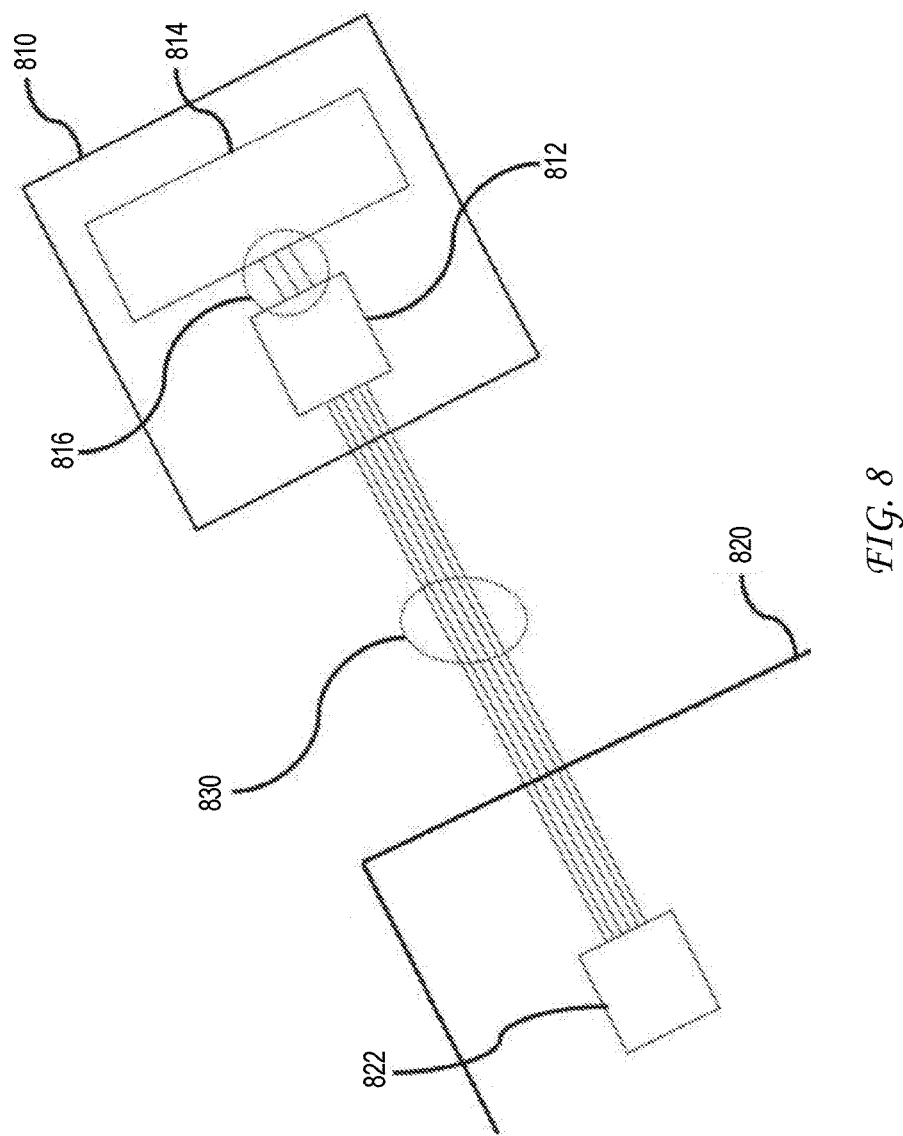
FIG. 8 illustrates an example connection of a sensor module unit to a wireless node using a universal sensor interface.

The connection of sensor module units to wireless nodes via a universal sensor interface enables an abstraction of the sensor interface from the wireless network infrastructure. FIG. 8 illustrates an example connection of a sensor module unit to a wireless node using the universal sensor interface. As illustrated, sensor module unit 810 is coupled to wireless node 820 via universal sensor interface 830. As noted above, in one embodiment, universal sensor interface 830 can include six connections (e.g., supply, ground, data in, data out, clock, and device select) between controller 812 in sensor module unit 810 and controller 822 in wireless node 820. The provision of a universal interface between the wireless node and one or more sensor module units moves the sensor-specific interface to the sensor module unit. As illustrated, controller 812 in sensor module unit 810 can support an interface 816 with sensor 814 that is particular to sensor 814. As would be appreciated, the particular interface between a sensor and a controller in the sensor module unit can vary depending on the particular type and characteristics of the sensor. In this framework, customized interfaces between the sensor and the controller are confined to the sensor module unit.

Figure 9:
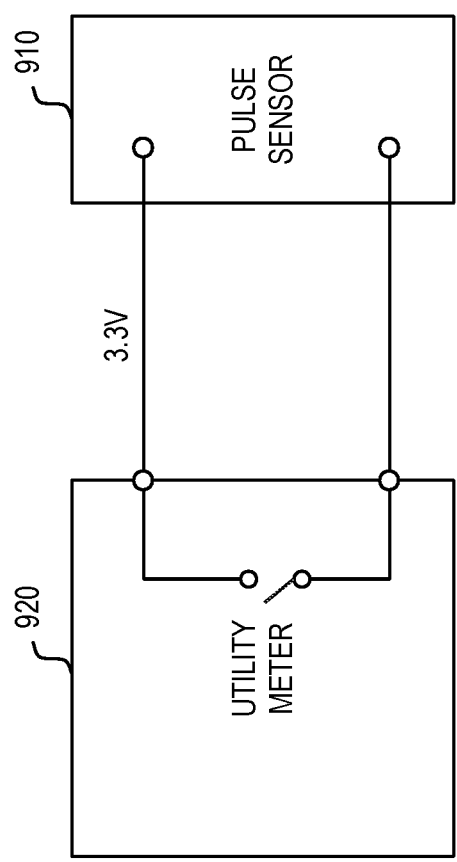
FIG. 9 illustrates an example embodiment of a pulse sensor.

In the present disclosure, it is recognized that sensors are generally tasked with taking measurements. The measurements themselves can represent sensor data that may or may not represent usable information. To illustrate this concept, consider the pulse sensor example of FIG. 9.

As illustrated, pulse sensor 910 can be coupled to utility meter 920 via a pair of conductors. The actual wired interface between pulse sensor 910 and utility meter 920 can vary depending on the type of utility meter that is present. As illustrated, pulse sensor 910 can be configured to provide 3.3V on a first conductor. Utility meter 920 includes a dry contact relay that would successively relay the 3.3V provided by pulse sensor 910 and then open the relay. In one example, a first state of the relay can correspond to a first part of a disk rotation, while a second state of the relay can correspond to a second part of a disk rotation. Where the first state of the relay corresponds to a first half of the disk rotation and the second state of the relay corresponds to a second half of the disk rotation, then a full rotation of the disk would encounter two changes in state of the sensed value at pulse sensor 910. As would be appreciated, utility meters can be defined such that a different number of state changes in the relay can be produced for a single disk rotation. Thus, while pulse sensor 910 can measure the number of changes in the state of the relay at utility meter 920 over a period of time, pulse sensor 910 would not know how many disk rotations actually occurred at utility meter 920 in that period of time. Without knowledge of the number of disk rotations that actually occurred at utility meter 920, information about the amount of a utility service consumed would not be available.

In the present disclosure, it is recognized that the same pulse sensor can be used to measure relay transitions in many different types of utility meters having different rates of correspondence between relay transitions and disk rotations. In converting the measured number of relay transitions into useful information, a transformation function can be defined to perform the conversion of sensor data into useful information.

Consider a simple example of a utility meter that has four relay transitions per disk rotation. In this example, a first transformation function (divide by four) can be a defined such that the number of detected relay state transitions by the pulse sensor is divided by four to produce a corresponding number of disk rotations. The number of disk rotations could then be converted by a second transformation function into an actual consumption quantity of the utility measured by the utility meter. As would be appreciated, the combination of the first and second transformation function can be defined to match the particular characteristics of the utility meter being monitored to produce useful information.

In the present disclosure, it is recognized that the definition of the transformation function for a pulse sensor effectively represents another form of effective configuration of the sensor module unit, wherein the configuration need not be performed prior to installation of the sensor module unit. In fact, this level of configuration can be performed without modification of the sensor module unit itself, further minimizing installation and maintenance costs. For example, if the utility meter at the monitored location is changed such that the number of relay transitions per disk rotation changes, then the transformation function applicable to that particular sensor channel of data can be modified without requiring a replacement or modification of the sensor module unit at the monitored location. In one embodiment, the configuration of the transformation function, which effectively configures the sensor module unit, can be performed through interaction by a user with the host system. The configured transformation function can then operate on sensor data received from the monitored location to produce usable information that can be stored in a database.

Another embodiment of the present disclosure can provide a machine and/or computer readable storage and/or medium, having stored thereon, a machine code and/or a computer program having at least one code section executable by a machine and/or a computer, thereby causing the machine and/or computer to perform the steps as described herein.

Those of skill in the relevant art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Those of skill in the relevant art can implement the described functionality in varying ways for each particular application. Various components and blocks may be arranged differently (e.g., arranged in a different order, or partitioned in a different way) all without departing from the scope of the subject technology.

These and other aspects of the present disclosure will become apparent to those skilled in the relevant art by a review of the preceding detailed disclosure. Although a number of salient features of the present disclosure have been described above, the principles in the present disclosure are capable of other embodiments and of being practiced and carried out in various ways that would be apparent to one of skill in the relevant art after reading the present disclosure, therefore the above disclosure should not be considered to be exclusive of these other embodiments. Also, it is to be understood that the phraseology and terminology employed herein are for the purposes of description and should not be regarded as limiting.

What is claimed is:

1. A device, comprising:
a wireless node module board having a first controller, a first set of one or more sensors that generates first sensor data, and a wireless transceiver that transmits the first sensor data to a gateway device at a monitored location via wireless communication for delivery to a host system that is remote from the monitored location, the wireless node module board having a wired communication interface for adding sensor capabilities to the device, the wired communication interface including a serial data signaling connection and a serial clock signaling connection; and
an extension sensor module board connected to the wireless node module board via the wired communication interface, the extension sensor module board having a second controller that communicates second sensor data to the first controller via the wired communication interface for transmission to the gateway device, the second sensor data generated by a second set of one or more sensors supported by the extension sensor module board.

2. The device of claim 1, wherein the wired communication interface includes a cable.

3. The device of claim 1, wherein the wired communication interface includes a connector interface for removable, pluggable insertion.

4. The device of claim 1, wherein the wired communication interface enables transmission of an identifier associated with the extension sensor module board.

5. The device of claim 1, wherein the wired communication interface enables transmission of measurement data recorded by a sensor on the extension sensor module board.

6. The device of claim 1, wherein the first set of one or more sensors includes a temperature sensor.

7. The device of claim 1, wherein the first set of one or more sensors includes a sensor configured to measure a health and/or status of the wireless node module board.

8. The device of claim 7, wherein the first set of one or more sensors includes a voltage sensor for a battery that powers the device.

9. The device of claim 1, wherein the wireless transceiver transmits link quality information for the wireless communication between the gateway device and the wireless transceiver.

10. The device of claim 1, wherein the second set of one or more sensors includes an environmental sensor.

11. The device of claim 1, wherein the extension sensor module board supports an external interface used to collect the second sensor data.

12. The device of claim 11, wherein the external interface is connected to an external device.

13. The device of claim 12, wherein the external device is a utility meter device and the external interface supports a transmission of pulse signals.

14. The device of claim 11, wherein the external interface is configured to receive an analog signal for measurement by the extension sensor module board.

15. The device of claim 14, wherein the analog signal is a voltage signal.

16. A method, comprising:
- generating, by an extension sensor module board, first sensor data derived from first measurements by a first set of one or more sensors supported by the extension sensor module board, the extension sensor module board connected to a wireless node module board via a wired communication interface;
- transmitting, by a first controller on the extension sensor module board, the first sensor data to a second controller on the wireless node module board using a serial data signaling connection and a serial clock signaling connection in the wired communication interface;
- transmitting, by a wireless transceiver supported by the wireless node module board, first sensor information based on the first sensor data via wireless communication with a gateway device at a monitored location at which the wireless node module board is installed for delivery to a host system that is remote from the monitored location;
- generating, by the wireless node module board, second sensor data derived from second measurements by a second set of one or more sensors on the wireless node module board; and
- transmitting, by the wireless transceiver, second sensor information based on the second sensor data via wireless communication with the gateway device for delivery to the host system.

17. The method of claim 16, wherein the extension sensor module board supports an external interface used to collect the second sensor data.

18. The method of claim 17, wherein the external interface is configured to receive an analog signal for measurement by the extension sensor module board.

19. The method of claim 18, wherein the analog signal is a voltage signal.

20. The method of claim 16, wherein the second sensor data includes information about a health and/or status of the wireless node module board.

* * * * *